Oct. 5, 1965
W. REIS
3,209,407
DEVICE FOR FACILITATING THE WORKING ON
SURFACES OF MOLDS OR THE LIKE
Filed Jan. 16, 1963
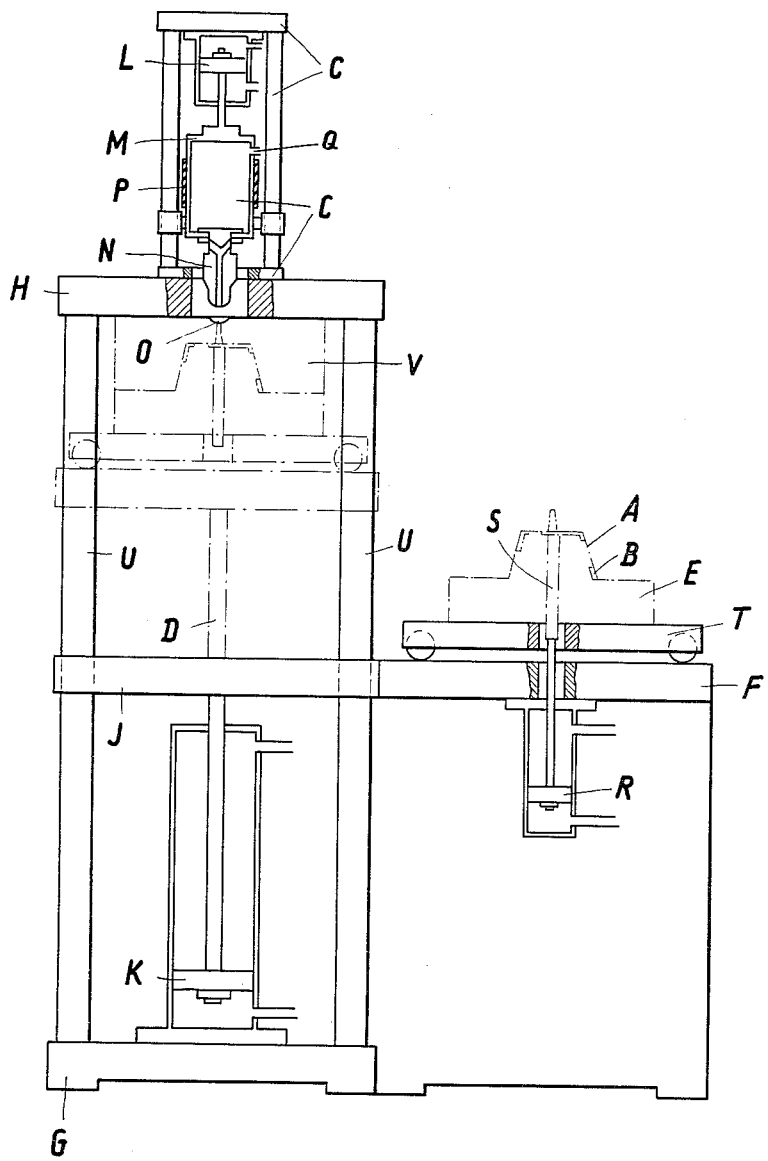
Inventor:
WALTER REIS
By Hane and Nydich
ATTORNEYS 3,209,407
DEVICE FOR FACILITATING THE WORKING ON SURFACES OF MOLDS OR THE LIKE
Walter Reis, Eisenbacher Strasse 3, Obernburg (Main), Germany
Filed Jan. 16, 1963, Ser. No. 251,852
Claims priority, application Germany, Jan. 22, 1962, P 28,641
4 Claims. (Cl. 18—30)

The invention relates to a device for facilitating the working on surfaces of molds or the like, more specifically the retouching of the said surfaces.

In mold construction and machine tool construction, especially in the manufacture of pressure casting molds, but also in connection with the manufacture of cutting and stamping tools, an essential part of the working time is used for the retouching of stamps or plates or imparting predetermined shapes or contours. The manner of working in this case is still very primitive. It is usual to place both mold halves, of which one is already in a finished condition, on top of each other and to fit them together for example by hammer blows, and then to further work, more particularly to retouch, the regions of the second mold half which have thus become recognizable as needing retouching in order to secure a more precise mating of the mold halves. Apart from the fact that this manner of working is time-consuming and cumbersome, it has the great disadvantage that the relative dispositions of the two mold halves in concave regions cannot be determined, that is to say it cannot be determined which contours are formed by the mold parts, whether the wall thicknesses are uniform, how the general mold passages extend, whether a step is present in the wall thicknesses, and most importantly, whether a dimensionally accurate contour is provided.

It has previously been necessary to test the degree to which a mold half requires to be further worked on by placing the two mold halves into test service, for example by testing them in an injection molding machine. This manner of working is time-consuming and cumbersome, since the molds have to be fitted into the machine in question, and removed therefrom after test, and usually have to be worked on while mounted in the machine.

It is an object of the invention to provide a device for facilitating the working on surfaces of molds or the like, more specifically the retouching of the said surfaces, by which the disadvantages of the previous manner of working are avoided and which simultaneously gives a simple and inexpensive possibility of testing the mold between the individual working steps.

With the device according to the invention, a combined working is possible, that is to say the performance of the already mentoned retouching steps and simultaneously also the detection of faults which are not recognizable during the retouching, for example differences in wall thickness or other differences in the mold concavity, which are otherwise not measurable or recognizable in the closed condition of the two mold halves.

It is a further object of the invention to provide a device for facilitating the working, especially retouching of molds for injection molding machines, or other machine tools, wherein an already prepared mold half is arranged on a yoke of a press and is connected with an injection unit, and the mold half which is to be worked upon is so arranged as to be movable in the press against the prepared mold half and also outside the press onto a working table having an ejection unit.

In this device, the injection unit built onto the press is an essential component since during the working, and without having to mount the mold on an injection molding machine, it enables testing of essential features of the working, namely:

(1) The relationships of wall thickness.
(2) The tightness of the mold.
(3) The tightness of retouched surfaces.
(4) The general operation of the mold.
(5) Steps in the wall thickness in the mold and the ease of flow offered to molding material, for example the matching of the flow to individual mold sections in the case of multiple molds in such a manner that all recesses in the mold are uniformly filled. This matching can be effected by an appropriate working of the mold cavities and passages.

The above and other objects and advantages of the invention will be clear from the following description given with reference to an embodiment illustrated by way of example in the accompanying drawing.

The device consists of three main parts, namely a press D, a working and ejection table F and an injection unit C.

The press proper, consists of a base plate G, a yoke H and a pressure plate J which is guided on four columns U. The pressure plate J is moved by a working cylinder K operated by pressure oil.

The injection unit C is arranged on the yoke H and the ready-prepared mold half V is arranged below the yoke H and fixed thereto.

The injection unit C comprises a base plate, two columns and a yoke. A small pneumatic cylinder L is arranged on the yoke and serves for urging a cylinder M containing molding material against the mold half V and for returning the cylinder M to its initial position. This cylinder M forms the main component of the injection unit C and is pressurised by being connected to a source of pressure (not shown) by a connection Q. On the lower side of the cylinder M a nozzle N is provided which engages a region of the mold half V having an inlet orifice O when the cylinder M is urged towards the mold half V by the pneumatic cylinder L. The nozzle N automatically opens when it engages the orifice O and automatically closes when the cylinder M is moved towards its initial position.

The cylinder M is heated by an electric heating band P of known construction, arranged around its periphery. The cylinder M moreover has an opening (not shown) through which it can be filled with molding material.

The manner of operation of the device is as follows:

The cylinder M of the injection unit C is filled with a molding material, for example based on paraffin, and is heated by the heating band P. The mass of molding material is thereby rendered fluid and is then available for use as an injection material. A control device (not shown) maintains the temperature of the molding material in the cylinder M constant. As soon as the injection material is fluid, a pressure medium, for example nitrogen or air can be introduced into the cylinder M through the connection Q by means of a valve (not shown) so that the heated mass is under pressure. This pressure can be selected by means of a simple control device (not shown) in order that a desired degree of filling of the mold cavities can be achieved. The mold half V is secured to the yoke H of the press with its open side facing downwards. The mold half E to be worked upon is arranged on a carriage T and is introduced thereby into the press and is lifted by the pressure plate J until it engages the prepared mold half V. This engagement position of the mold halves E and V is illustrated in the drawing in dash-dotted lines.

Prior to the movement of the mold half E onto the pressure plate J, it can be worked on on the working table F.

When the cylinder M is moved by the pneumatic cylinder L in the downwards direction, that is to say into engagement with the mold half V, the nozzle N engages the region of the orifice O of the mold half V and automatically opens so that the injection molding material is forced into the cavities B of the mold.

Since the injection molding material is very readily flowing, it is especially suitable for testing purposes since its escape from badly sealed parts of the mold or badly fitting parts can easily be detected.

After the injection step has been effected, the cylinder M is returned into its initial position by the pneumatic cylinder L and the cylinder M is refilled with injection material.

The lower mold half E on the carriage T is then moved by means of the pressure plate J again back to the level of the working table F and is moved out onto the working table F by means of the carriage T, so that retouching can be carried out on the mold half E without being impeded by the press.

A pneumatic cylinder R is arranged below the working table F and serves for operating an ejection unit S.

The arrangement of the carriage T for the lower mold half E, in addition to allowing an unimpeded working, also allows the ejection unit to be provided on the working table F. Furthermore, the arrangement improves the safety with which the mold halves can be worked upon, since it is now possible to use a crane or other lifting device for lifting mold halves onto the carriage T and since it is now no longer necessary to fit the mold halves into a normal injection molding machine to test their accuracy.

The invention is not limited to the embodiment described and many modifications, omissions or additions may be made within the spirit and scope of the invention as defined in the following claims.

I claim:

1. A testing machine for testing the trueness of two-part molds, said machine comprising an upright frame structure, a mold part having a cavity and constituting a true part of a two-part mold to be tested, said mold part being fixedly mounted on said frame structure with the cavity in downwardly facing position, a stationary horizontal working table extending laterally from said frame structure, a lifting table supported by said frame structure, slidable up and down along the same, pressure means coacting with said lifting table for moving the same between a lowered loading position in alignment with said working table and a raised testing position, a carriage for placing thereupon a prefabricated mold part to be tested, said carriage being movable between a position on said working table in which the tested mold part is accessible for finishing work and a position on said lifting table for lifting the carriage from said latter position into a position in which the mold part to be tested is in a cavity-closing position with said true mold part secured to the frame structure, and investing means mounted on said frame structure for investing the closed mold with a hardening testing slurry in liquefied condition to test the tightness of the closed mold.

2. A testing machine according to claim 1 and comprising ejecting means supported on said working table and coacting with said carriage in a predetermined position of the latter on the working table for ejecting hardened slurry from the mold part supported on the carriage.

3. A testing machine according to claim 1 wherein said fixedly mounted true mold part has in its upwardly facing side a filling stud, and wherein said investing means comprises an ejection feed means having a feed nozzle movable into and out of a filling position in which said nozzle is in pressure engagement with said filling stud, said nozzle being open for feeding slurry when and while in such pressure engagement with the filling stud.

4. A testing machine according to claim 3 wherein said investing means are mounted on said frame structure, slidable up and down, and wherein pressure means coact with said investing means for moving the same into and out of the filling position.

References Cited by the Examiner

UNITED STATES PATENTS

| | | | |
|---|---|---|---|
| 1,800,849 | 4/31 | Stacy | 18—16 |
| 2,412,671 | 12/46 | Brunner | 18—17 X |
| 2,629,132 | 2/53 | Willcox et al. | |
| 2,657,429 | 11/53 | Faust | 18—30 |
| 2,738,551 | 3/56 | Howald | 18—30 X |
| 2,946,100 | 7/60 | Baier et al. | 22—200.1 X |
| 2,983,953 | 5/61 | Borah | 18—16 |
| 3,091,809 | 6/63 | Trueblood | 18—30 |
| 3,129,462 | 4/64 | Borah | 18—16 |

J. SPENCER OVERHOLSER, *Primary Examiner.*

MICHAEL V. BRINDISI, *Examiner.*